United States Patent [19]

Berger

[11] 4,074,327
[45] Feb. 14, 1978

[54] AUTOMATIC STOP SYSTEM FOR A TAPE RECORDER

[75] Inventor: Bernard Berger, New Rochelle, N.Y.

[73] Assignee: Morse Electro Products Corporation, Brooklyn, N.Y.

[21] Appl. No.: 650,909

[22] Filed: Jan. 21, 1976

[51] Int. Cl.² ................. G11B 15/48; G11B 21/08
[52] U.S. Cl. ................................... 360/74; 360/78
[58] Field of Search ............... 360/74, 69, 78, 106; 242/190

[56] References Cited

U.S. PATENT DOCUMENTS

| 3,575,422 | 4/1971 | Peltz et al. | 360/74 |
| 3,592,476 | 7/1971 | MacDonald | 360/74 |
| 3,754,695 | 8/1973 | Suzuki | 360/74 |
| 3,779,498 | 12/1973 | Takashino | 360/74 |
| 3,887,943 | 6/1975 | Katsurayama | 360/74 |

Primary Examiner—Daryl W. Cook
Attorney, Agent, or Firm—Amster & Rothstein

[57] ABSTRACT

A system for automatically stopping a multi-channel tape player after completion of recording of information on a selected channel of a multi-channel tape.

4 Claims, 5 Drawing Figures

AUTOMATIC STOP SYSTEM FOR A TAPE RECORDER

The invention relates generally to multiple track tape players and in particular to an improved automatic stopping apparatus which is capable of stopping the tape player at the end of a pre-selected one of the multiple tracks.

Multi-track tape players normally include a tape head indexing cam which automatically indexes the tape head relative to the multi-track tape at the end of each channel. In this manner, the tape head is indexed from channel to channel for continuous operation of the tape system. When the system is in the record mode, such continuous operation would result in unintended erasure of previously recorded information and recording of new information unless the tape is stopped at the end of an appropriate tape channel.

There have been many previous attempts made to overcome this problem. One example, U.S. Pat. No. 3,572,723, issued on Mar. 30, 1971, to Jenkins et al. discloses a track changing device for a multi-channel tape player in which a cam and follower energizes a solenoid after the completion of the last tape channel thereby removing electrical power from the tape player and stopping the tape. While the Jenkins et al. tape player provides automatic shutoff, it requires a relatively expensive and complex electrical and mechanical operating system. Other examples are found in U.S. Pat. Nos. 3,492,005; 3,764,147; 3,575,421; 3,643,902; 3,633,897; 3,592,476.

Accordingly, it is an object of this invention to overcome the deficiencies in the prior art and provide an automatic stop system for a multi-track tape player which is capable of stopping the tape player at a predetermined position of the tape.

It is a more specific object of the invention to provide an automatic stop system for a multi-channel tape player which responds to the completion of the recording of information on the last of the multiple channels of the tape to prevent unintended recording of information on the tape.

In accordance with the present invention, a tape player is provided with an automatic stop system to stop the tape player at a predetermined position of the multi-channel tape. The automatic stop system includes an indexing member coupled to the tape head indexing cam. The indexing member carries a control member appropriately positioned for engaging a pivotably mounted deactivating arm, when the tape reaches a predetermined position, preferably after the completion of the last tape channel. An electrical switch operative to couple a source of power to the tape player is mounted to be selectively moved from a reset position wherein it engages a reset member to an operative position within the path of movement of the deactivating arm.

In a typical operation, the electrical switch is positioned in the operative position in the path of movement of the deactivating arm when the tape player is in the record mode. At the end of each tape channel, the tape head indexing cam is rotated to position the tape head for operation with the next successive tape channel. Rotation of the indexing cam produces corresponding rotation of the indexing member. At the completion of a pre-selected channel of the tape, the control member carried on the indexing member engages the deactivating arm which pivots into engagement with the electrical switch. Upon thus being engaged, the electrical switch removes the source of power from the tape player, thereby stopping the movement of tape. The tape is then removed from the tape player and the electrical switch returned to the reset position where it engages the reset member which resets the switch to couple the source of power to the tape player rendering the tape player ready for the next use.

These and other objects and features of the invention will be best understood and appreciated by reference to the following detailed description of the presently preferred but nonetheless illustrative embodiment of the present invention when taken in conjunction with the accompanying drawings, wherein.

Figure 1:
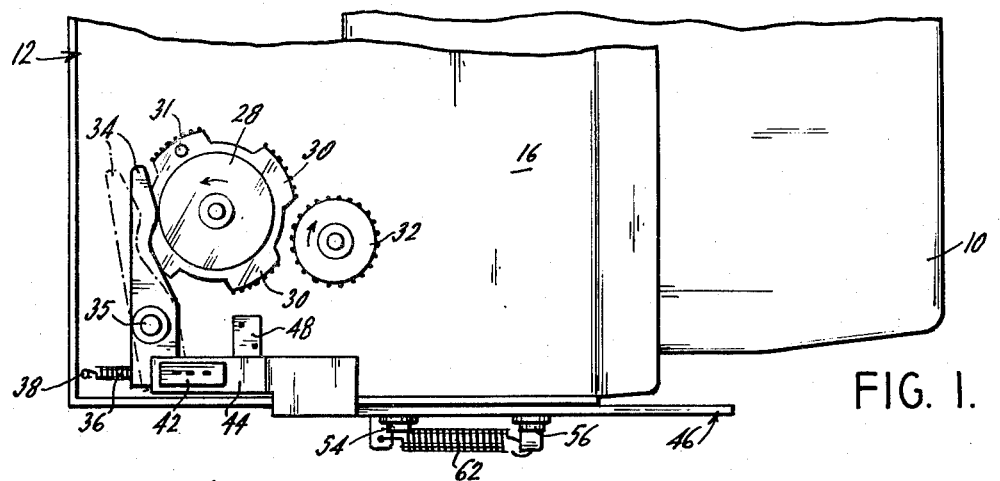
FIG. 1 is a bottom plan view of a portion of a tape player showing the automatic stop system of the invention including the index member and deactivating arm.
Figure 2:
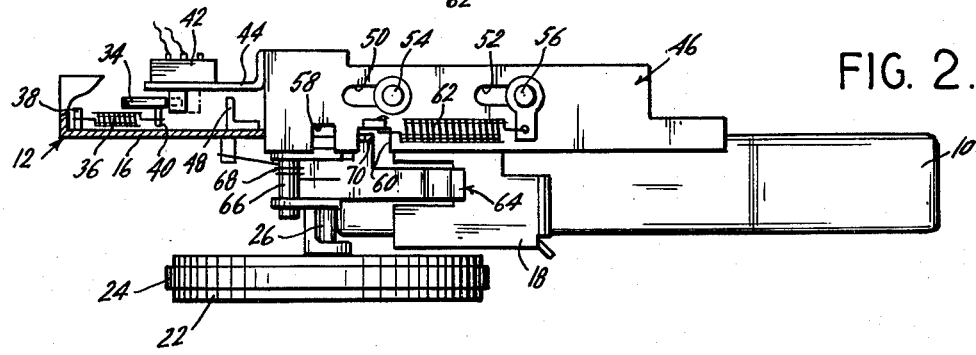
FIG. 2 is a side elevation partially in section and partially cut away of the automatic stop system of the invention, showing the tape player in the record mode and the electrical switch in the path of travel of the deactivating arm.
Figure 3:
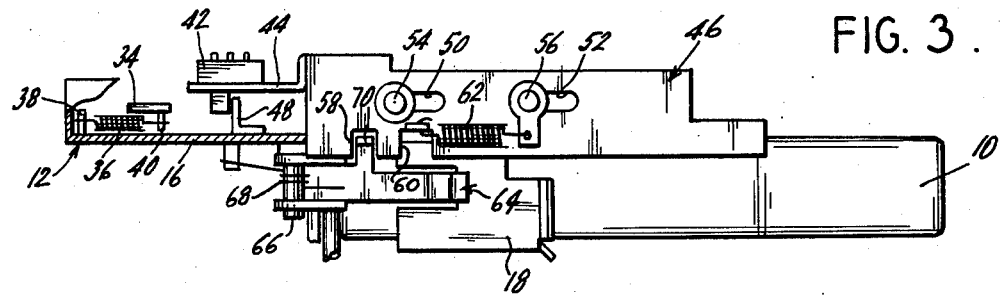
FIG. 3 is a side elevation view of the automatic stop system of the invention showing the tape player in the playback mode.
Figure 4:
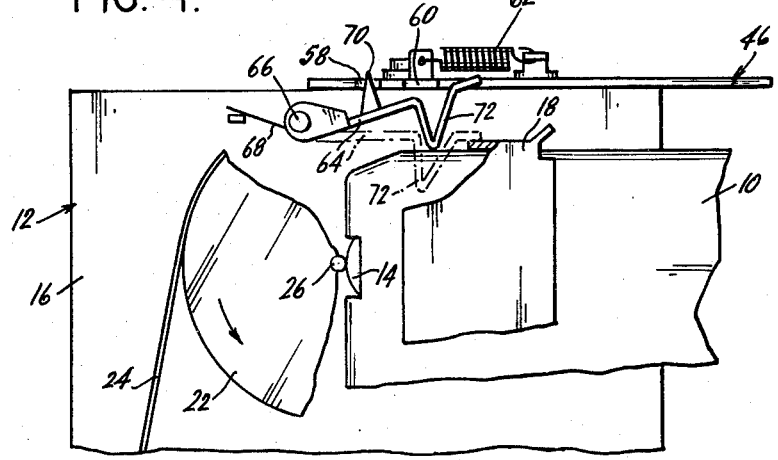
FIG. 4 is a top plan view of the tape player showing the tape player in the playback mode.
Figure 5:
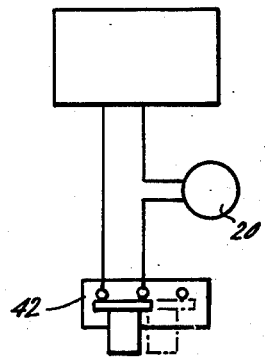
FIG. 5 is a diagrammatic representation of the tape player motor control.

Referring to FIGS. 1–5, there is shown a multi-channel tape cartridge system in which reference numeral 10 denotes a typical tape cartridge housing an endless loop of multi-channel magnetic tape adopted to be inserted into and removed from a tape player, partially shown and generally designated by reference numeral 12. Tape cartridge 10 typically includes a pinch roller 14 (FIG. 4) extending through a window disposed in the forward end of the cartridge and a detent formed in the side face of the housing for securing the cartridge in the tape player. Details of the construction and arrangement of the various components of tape cartridge 10 are well-known and need not be described in further detail.

The tape player includes a frame 16 to which is mounted a cartridge guide 18 for aiding in positioning the cartridge in the player. A tape system drive motor, shown diagrammatically in FIG. 5 as reference numeral 20, is also fixed to the frame. Fly wheel 22 is coupled to the drive motor by belt 24. A capstan 26, mounted for rotation with the fly wheel 22 pulls the multi-channel tape through the tape player by engagement of pinch roller 14 with the tape as is well known. The tape player also includes record and playback heads (not shown) for recording and playing back of information from the various tape channels and a tape head indexing cam (not shown) which is automatically indexed at the end of each tape channel to position the tape head for operation with the next successive channel of the multi-channel tape. A program light switch (not shown) is mounted for movement with the tape head indexing cam to provide an indication of the operative channel on the multi-channel tape, as is known in the art.

Coupled to the tape head indexing cam is an indexing member 28 having a number of indexing extensions, 30, equal in number to the number of channels of the multi-channel tape. In the particular embodiment shown, there are four such extensions and accordingly, the tape player is arranged to play a four channel tape. Mounted on one of the extensions is a control member 31, which is carried by the indexing member for the purpose to be explained below. An indexing gear 32, is mounted on capstan 26 for rotation in the direction of the arrow and has teeth which engages teeth on indexing extensions 32 for rotation of indexing member 28.

Deactivating arm 34 pivotably mounted to frame 16 is urged into engagement with indexing member 28 by spring 36 attached to pin 38 extending from frame 16 and at the other end to pin 40 extending from one end of arm 34. An electrical "on-off" switch 42 arranged to couple a source of electrical power to motor 20 is mounted on bracket 44 attached to mode selector lever 46 which is used to select either the record or playback mode for the operation of the tape player. The mode select lever is slidably mounted to the frame 16 of the tape player and includes a pair of elongated slots 50, 52 having pins 54, 56 extending therethrough. A spring 62 has one end mounted on the frame 16 and its opposite end attached to mode selector lever 46 for urging the mode select lever to a forward or release position. The tape player also has a tape cartridge locking mechanism including cartridge locking arm 64 pivotably mounted to spindle 66. Spring 68 is arranged to urge locking arm 64 into the dotted line rest position shown in FIG. 4. Extending from locking arm 64 is a mode select finger 70 which engages either windows 58 or 60 in the mode select lever for locking the mode select lever in the desired selected mode of operation. The forward end of locking arm 64 has a V-shaped section 72 which rides on the forward edge and side of the cartridge as the cartridge is inserted into the tape player urging finger 70 into engagement with one of windows 58, 60.

To operate the tape player, mode select lever 46 is slid rearwardly to select either the record or playback mode. When the lever is in the intermediate position (FIGS. 3 and 4), the playback mode is selected and when the lever is in the fully rearward position (FIGS. 1 and 2), the record mode is selected. When the tape player is in the record mode, switch 42 is in the path of travel of arm 34 (FIG. 2) while when the tape player is in the playback mode, switch 42 is outside the path of travel of arm 34. After the desired mode is selected, cartridge 10 is inserted through guides 18 into the tape player. The forward end of the cartridge engages V-section 72 of arm 64 which rotates about spindle 62 extending finger 70 through windows 58 or 60 to lock mode selecting lever 46. For purposes of explanation, it will be considered that the record mode is selected so that the tape player assumes the configuration shown in FIG. 2. An appropriate electrical starting switch, not shown, is activated and a source of electrical power is connected to motor 20 through closed electrical switch 42. Motor 20 operates to produce rotation of flywheel 22 and capstan 26 which in turn pulls tape past the tape heads.

At the end of each tape channel, a tape head indexing cam (not shown) together with indexing cam 28 are automatically activated and begin to rotate in the direction of the arrow until the teeth on an indexing cam extensions 30 engage the indexing gear 32 which then drives the indexing cam through the remainder of its 90° rotation. The tape head operatively coupled to the tape head indexing cam is repositioned for operation with the next tape channel and recording continues. The operation is repeated after the completion of each channel, however, at the completion of the last tape channel, the system is automatically stopped as will now be explained.

At the completion of the last tape channel, the indexing cam 28 is in the position shown in FIG. 1. The tape head indexing cam is activated in the usual manner producing rotation of indexing cam 28 into driving engagement with gear 32. As the indexing cam 28 is now rotated, pin 31 engages one end of deactivating arm 34 pivoting arm 34 about pin 35 into the dotted line position shown in FIGS. 1 and 2. The opposite end of lever arm 34 is thereby pivoted into engagement with switch 42, moving the switch to the "off" or dotted line position (FIG. 2), thereby removing the power source from drive motor 20, stopping the tape player. Before the tape player is stopped, however, indexing cam 30 and gear 32 rotate sufficiently to permit the forward end of lever arm 34 to again engage the central portion of cam 28. In this manner, the tape player is automatically stopped and unintended recording of information on the first channel is prevented. When the tape cartridge is withdrawn from the tape system, mode selector lever 46 is slid forwardly and electric switch 42 engages reset bracket 48 which restores switch 42 to its "on" position thus resetting the tape player for the next use.

While the invention has been particularly shown and described with reference to a preferred embodiment, it will be understood by those skilled in the art that a wide lattitude of modification and change can be made in form and detail of construction without departing from the spirit and scope of the invention.

What is claimed is:

1. In a tape player for a multi-channel tape including a tape head and means operative to move said multi-channel tape past said tape head, the combination comprising, switch means for coupling a source of power to said tape player, a deactivating member pivotably mounted on said tape player, means mounting said switch means for selective movement relative to the movement path of said deactivating member and control means including an indexing member operatively mounted in said tape player for movement at the end of each tape channel and a control member positioned on said indexing member for engagement with one end of said deactivating member, the opposite end of said deactivating member being positioned for movement in response to the engagement of the deactivating member by said control member into engagement with said switch means for disconnecting the source power from said tape player.

2. The system of claim 1 wherein said switch mounting means includes a mode select lever slidably mounted on said tape player for selecting the mode of operation of said tape player.

3. The combination with a tape player operative to record information successively on each channel of a multi-channel tape including a tape head operatively positioned relative to said multi-channel tape, means for moving said multi-channel tape past said tape head and an indexing cam coupled to the tape head and responsive to the end of each of the multiple channels of said tape for positioning said tape head for successive operation with each channel of the multi-channel tape, an automatic shut-off for removing power from said tape player at the end of the last channel of the multi-channel tape comprising a deactivating member operatively mounted in said tape player for movement through a predetermined path of travel, switch means operatively coupling a source of power to said tape player and selectively positionable within the path of travel of said deactivating member, control means positioned in controlling relation to said deactivating member and responsive to the completion of the last of the multiple tape channels for moving said deactivating member through its path of travel to engage said switch means and removing the source of power from said tape player and reset means positioned in the path of travel of said switch means for resetting said switch means to reconnect the source of power to said tape player after ths source of power has been removed from said tape player.

4. The combination of claim 3 further including a mode select lever for selecting of mode of operation of said tape player, said switch means being mounted on said mode select lever for movement into the path of travel of said contract arm upon the selection of the record mode of operation for the tape player.

* * * * *